US008085558B2

(12) United States Patent
Choi (10) Patent No.: US 8,085,558 B2
(45) Date of Patent: Dec. 27, 2011

(54) RESONANT CONVERTER

(75) Inventor: Hang-Seok Choi, Gunpo (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 425 days.

(21) Appl. No.: 12/361,401

(22) Filed: Jan. 28, 2009

(65) Prior Publication Data
US 2009/0196074 A1 Aug. 6, 2009

(30) Foreign Application Priority Data
Jan. 31, 2008 (KR) .................. 10-2008-0010368

(51) Int. Cl.
*H02M 3/335* (2006.01)
(52) U.S. Cl. .................. 363/21.02; 363/21.15
(58) Field of Classification Search ............. 363/21.02, 363/21.15
See application file for complete search history.

(56) References Cited

U.S. PATENT DOCUMENTS 6,018,467 A * 1/2000 Majid et al. ............. 363/16
6,087,782 A * 7/2000 Majid et al. ............. 363/16

OTHER PUBLICATIONS

Fairchild Semiconductor, Application Note AN-4151, Half-Bridge LLC Resonant Converter Design using FSFR-Series Fairchild Power Switch (FPS), Oct. 2007, 1.0.0, pp. 1-17.*

* cited by examiner

*Primary Examiner* — Jue Zhang
(74) *Attorney, Agent, or Firm* — Sidley Austin LLP (57) ABSTRACT

A resonant converter includes a square wave generator including a first switch and a second switch, and generating a first square wave corresponding to an input voltage by alternately turning on/off the first and second switches; a resonator including a first coil of a primary coil of a transformer, and generating a resonance waveform corresponding to the first square wave; and an output unit including a second coil of a secondary coil of the transformer, and outputting a voltage corresponding to a current generated in the second coil corresponding to the resonance waveform. The square wave generator includes a pulse frequency modulation controller for turning on/off the first and second switches, comparing a first voltage linearly increased while the second switch maintains the turn-on state and a second voltage corresponding to an integration value on the time of the current flowing to the second switch when the second switch is turned off, and changing on/off drive frequencies of the first and second switches according to a comparison result. Therefore, a resonant converter driven with safety is realized.

16 Claims, 7 Drawing Sheets

RESONANT CONVERTER

CROSS-REFERENCE TO RELATED APPLICATION

This application claims priority to and the benefit of Korean Patent Application No. 10-2008-0010368 filed in the Korean Intellectual Property Office on Jan. 31, 2008 the entire contents of which are incorporated herein by reference.

BACKGROUND OF THE INVENTION

1. Field of the Invention

The present invention relates to a resonant converter.

2. Description of the Related Art

A converter is a device for converting a DC voltage into at least one DC voltage. In some cases the DC output voltage is greater, in others less than an input voltage. The converter is mainly used for battery power supplies such as power electronic devices, particularly mobile phones and laptop computers.

A resonant converter is widely used because it can improve power conversion efficiency.

In general, a resonant converter includes a transformer, and maintains the DC output voltage that is output through an output terminal coupled to a secondary coil of the transformer by controlling an on/off drive frequency of two switches Q1 and Q2 coupled to a primary coil of the transformer receiving the DC voltage. For this, the resonant converter includes a feedback loop for transmitting a voltage or a current of an output unit to the primary coil of the transformer through an element such as an opto coupler or a shunt regulator.

A general resonant converter performs a protection function for preventing circuit elements from being damaged by controlling power transmitted to an output load side by controlling switching frequencies of the two switches Q1 and Q2 of the primary coil of the transformer under an abnormal operation condition such as an overload or an output terminal short. The power input to the resonant converter can be sequentially varied within a short period in which the two switches Q1 and Q2 are turned on/off once. In order to check whether an overload or an output terminal short is generated corresponding to the change of the input power, the general resonant converter can include a low pass filter for acquiring an average of input power within the period of operation.

However, in some general resonant converters it is difficult to quickly control the input power because of a delay time of the low pass filter when high power is instantly input at the input terminal, and hence, drive stability for the resonant converter is not optimal.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a resonant converter that is stably driven without damaging circuit elements under the abnormal operation condition such as an overload or an output terminal short.

An exemplary embodiment provides a resonant converter including a square wave generator including a first switch and a second switch, and generating a first square wave corresponding to an input voltage by alternately turning on/off the first and second switches; a resonator including a first coil of a primary coil of a transformer, and generating a resonance waveform corresponding to the first square wave; and an output unit including a second coil of a secondary coil of the transformer, and outputting a voltage corresponding to a current generated in the second coil corresponding to the resonance waveform, and the square wave generator includes a pulse frequency modulation controller for turning on/off the first and second switches, comparing a first voltage linearly increased while the second switch maintains the turn-on state and a second voltage corresponding to an integration value on the time of the current flowing to the second switch when the second switch is turned off, and changing on/off drive frequencies of the first and second switches according to a comparison result.

In some embodiments, a resonant converter for preventing the circuit from being damaged when high power is instantly input under the abnormal operation condition such as an overload or an output terminal short can be realized.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Figure 1:
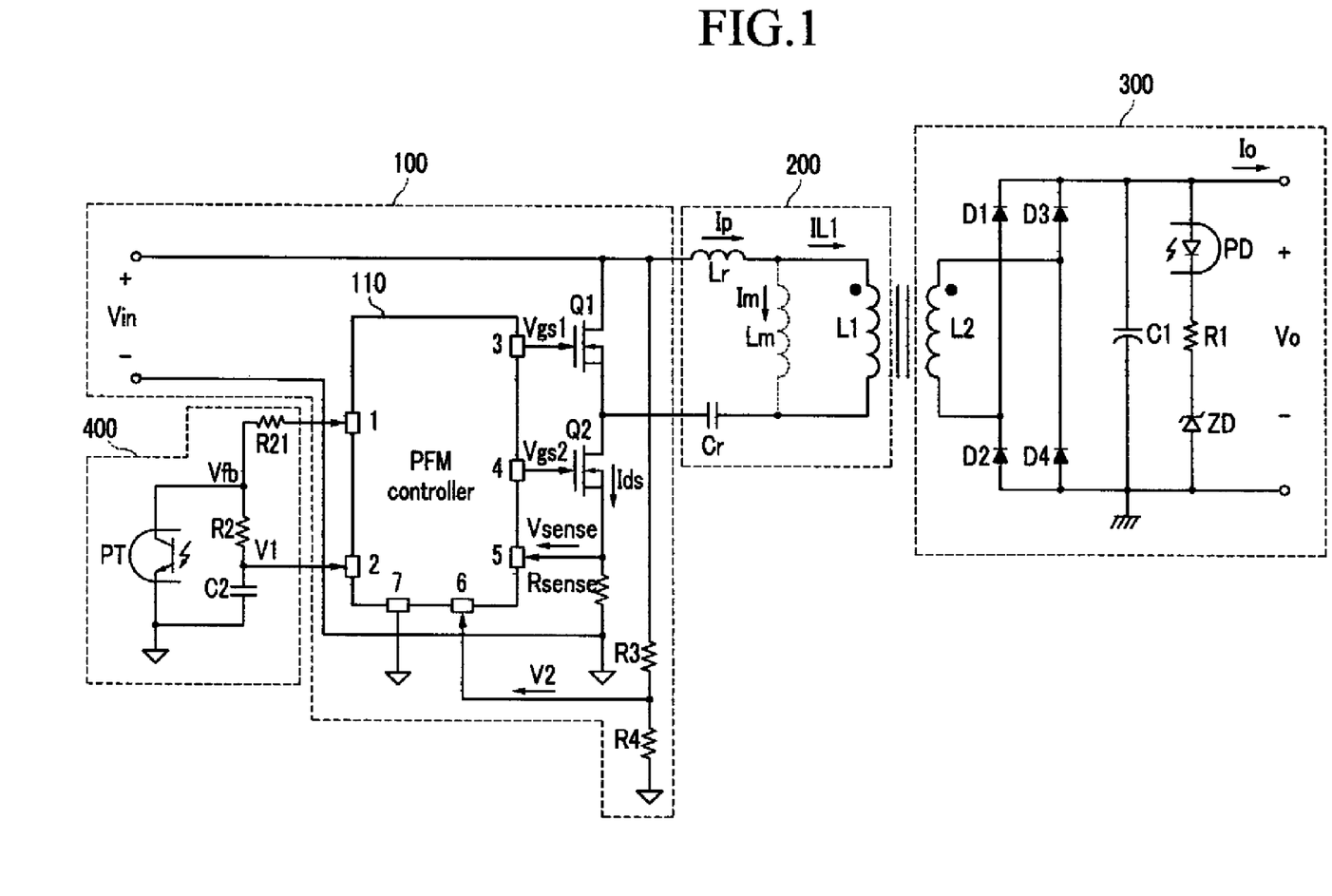
FIG. 1 shows a configuration of a resonant converter.

FIG. 1 shows a resonant converter. The resonant converter can include a square wave generator 100, a resonator 200, an output unit 300, and a feedback circuit 400.

The square wave generator 100 can includes a PFM controller 110, switches Q1 and Q2, and resistors Rsense, R3, and R4, and generates a square wave corresponding to on/off states of the switches Q1 and Q2.

The switch Q1 has a first terminal coupled to a node between a first terminal of an input terminal of an input voltage Vin and an resonant inductor Lr. The switch Q2 has a first terminal coupled to a node between a second terminal of the switch Q1 and the resonant capacitor Cr, and a second terminal coupled to a first terminal of the resistor Rsense. A second terminal of the resistor Rsense may be coupled to a node between a second terminal of an input terminal of the input voltage Vin and a ground. The resistor R3 and the resistor R4 are coupled between the first terminal of the switch Q1 and the ground.

The PFM controller 110 generates a pulse frequency modulation signal corresponding to a feedback signal Vfb, a divided voltage V2, and a sense voltage Vsense and outputs control signals Vgs1 and Vgs2 for controlling on/off states of the switches Q1 and Q2.

Here, the PFM controller 110 alternately turns on/off the two switches Q1 and Q2. Also, the PFM controller 110 drives the two switches Q1 and Q2 so that their duty cycles may be 50%. In other embodiemtns, the duty cycles can be different. The PFM controller 110 can provide a dead time of several hundreds of ns between the control signal Vgs1 and the control signal Vgs2 so that the switch Q1 and the switch Q2 may not be turned on simultaneously, and hence it prevents a penetration current caused by the arm short phenomenon and controls the switches Q1 and Q2 to perform a zero voltage switching (ZVC) operation. Here, the dead time represents a period for maintaining the switch Q1 and the switch Q2 at the turned off state.

Also, the divided voltage V2 may be applied to a node between the resistor R3 and the resistor R4 corresponding to the input voltage Vin, and the sense voltage Vsense may be applied to the first terminal of the resistor Rsense corresponding to a current Ids flowing from a drain of the switch Q2 to a source according to an on/off state of the switch Q2.

Here, the PFM controller 110 performs a pulse frequency modulation (PFM) operation on a pulse frequency that may be an on/off frequency of the two switches Q1 and Q2 according to a feedback signal Vfb that may be input by the feedback circuit 140 in order to maintain the voltage Vo that may be output by the output unit 300.

The PFM controller 110 compares the divided voltage V2 and the sense voltage Vsense when the switch Q2 is turned on and turned off. The PFM controller 110 can determine that an over power may be input when the divided voltage V2 is less than the voltage Vsense, and modulates the on/off frequencies of the two switches Q1 and Q2 to increase so as to prevent the over power from being transmitted to the output unit 300. That is, the resonant converter can realize a resonant converter for quickly processing an over power input and performing a stabler operation compared to the general resonant converter using a filter.

The resonator 200 can include inductors Lr and Lm, a primary coil L1 of the transformer, and a resonant capacitor Cr, and transmit part of a resonant current that may be generated by resonating the square wave generated by the square wave generator 100 to the output unit 300. Here, the inductor Lm represents a parasitic inductance component that may be generated at the primary coil L1 of the transformer. In detail, the inductor Lm represents magnetizing inductance, and it functions as a shunt inductor for controlling the current (Ip-IL1=Im), other than the current IL1 that may be induced to the secondary coil L2 of the transformer through the primary coil L1 of the transformer from among the current Ip flowing to the resonant inductor Lr, to flow to the resonant capacitor Cr. That is, the inductor Lm maintains a voltage gain of the resonant converter to control the output voltage Vo with an almost constant frequency irrespective of a load change when the load at the output terminal may be changed.

The resonant inductor Lr has a first terminal coupled to the first terminal of the switch Q1. The first terminal of the primary coil L1 of the transformer may be coupled to the second terminal of the resonant inductor Lr. The first terminal of the resonant capacitor Cr may be coupled to the second terminal of the primary coil L1 of the transformer, and the second terminal may be coupled to a node between the switch Q1 and the switch Q2. The inductor Lm may be formed at the primary coil L1 of the transformer as the current flows to the primary coil L1 of the transformer. Here, inductance of the inductor Lm may be very much greater than inductance of the resonant inductor Lr. For example, the inductance of the inductor Lm can be realized to be three to eight times the inductance of the resonant inductor Lr.

The feedback circuit 400 can include a photo transistor PT, a resistor R2, a resistor R21, and a feedback capacitor C2.

The photo transistor PT can form a photocoupler together with a photodiode PD of the output unit 300, and may be coupled between the first terminal 1 of the PFM controller 110 and the ground. The resistor R2 has a first terminal coupled to the first terminal 1 of the PFM controller 110, and a second terminal coupled to a first terminal of the resistor R21. A second terminal of the resistor R21 may be coupled to the second terminal 2 of the PFM controller 110. The feedback capacitor C2 may be coupled between a second terminal of the resistor R2 and the ground.

The photo transistor PT may be driven by receiving the current that flows through the photodiode PD of the output unit 300. For example, when the output voltage Vo may be increased, the feedback voltage Vfb charged in the feedback capacitor C2 can be set to be reduced, and when the output voltage Vo may be reduced, the feedback voltage Vfb charged in the feedback capacitor C2 can be set to be increased. The PFM controller 110 can control drive frequencies of the switches Q1 and Q2 according to the feedback voltage (Vfb), and controls the output voltage (Vo) to be constant through the pulse frequency modulation.

The output unit 300 can include a secondary coil L2 of the transformer, diodes D1, D2, D3, and D4, a capacitor C1, a photodiode PD, a resistor R1, and a Zener diode ZD, and it outputs a voltage Vo corresponding to the current induced from the resonator 200 to the secondary coil L2 of the transformer.

The diode D1 has an anode coupled to a first terminal of the secondary coil L2 of the transformer. The diode D2 has a cathode coupled to a node between the diode D1 and the first terminal of the secondary coil L2 of the transformer, and an anode coupled to the ground. The diode D3 has an anode coupled to a second terminal of the secondary coil L2 of the transformer, and a cathode coupled to a cathode of the diode D1. The diode D4 has an anode coupled to the ground, and a cathode coupled to a node between the first terminal of the secondary coil L2 of the transformer and the anode of the diode D3. The capacitor C1 has a first terminal coupled to the cathode of the diode D3, and a second terminal coupled to the ground.

The photodiode PD has an anode coupled to a first terminal of the capacitor C1. The resistor R1 has a first terminal coupled to a cathode of the photodiode PD. The Zener diode ZD has a cathode coupled to a second terminal of the resistor R1, and an anode coupled to the ground. Here, the voltage at the capacitor C1 may be the output voltage Vo, and the current flowing to the photodiode PD may vary according to the output voltage Vo. The photodiode PD forms a photocoupler together with the photo transistor PT of the feedback circuit 400, and provides information corresponding to the output voltage Vo to the feedback circuit 400.

When the switch Q2 of the square wave generator 100 is turned on, the diodes D2 and D3 of the output unit 300 are turned on, and when the switch Q1 of the square wave generator 100 is turned on, the diodes D1 and D4 of the output unit 300 are turned on. Accordingly, the current induced from the primary coil L1 of the transformer to the secondary coil L2 of the transformer may be rectified and output through the diodes D1, D2, D3, and D4.

For reference, not shown in FIG. 1, the two switches Q1 and Q2 included in the square wave generator 100 can include a body diode for controlling the current to flow from the source to the drain according to the characteristic of the metal oxide semiconductor field-effect transistor (MOSFET). Also, while the two switches Q1 and Q2 included in the square wave generator 100 are shown as MOSFET's, other types of switches performing the same operation can be used as well. For reference, the current induced from the primary coil L1 of the transformer to the secondary coil L2 of the transformer may be proportional to respective turn ratios of the primary coil L1 and the secondary coil L2.

The PFM controller 110 of the resonant converter according to an exemplary embodiment of the present invention shown in FIG. 1 will now be described with reference to FIG. 2 to FIG. 8.

Figure 2:
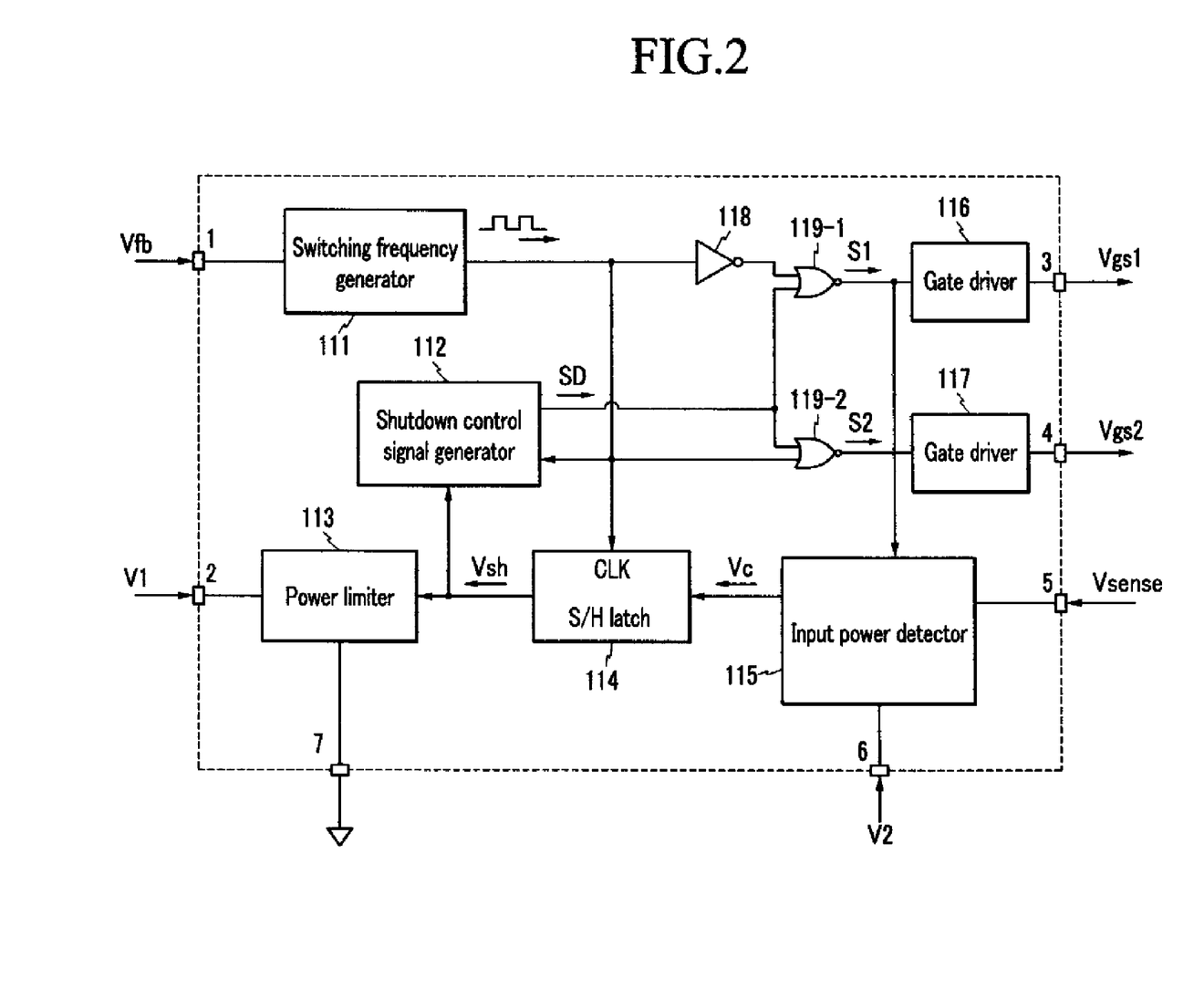
FIG. 2 shows an internal configuration of a PFM controller 100 of a resonant converter.

FIG. 2 shows an internal configuration of a PFM controller 100 of a resonant converter. The PFM controller 100 can include a switching frequency generator 111, a shut down control signal generator 112, a power limiter 113, a sample/hold latch 114, an over power detector 115, gate drivers 116 and 117, an inverter 118 and NOR gates 119-1 and 119-2.

The switching frequency generator 111 outputs a square wave corresponding to the feedback signal Vfb input by the feedback circuit 400.

The shut down control signal generator 112 can generate a shut down delay signal SD by using the square wave output by the switching frequency generator 111 and the sampling signal Vsh output by the sample/hold latch 114, and transmits the shut down delay signal SD to the NOR gates 119-1 and 119-2.

The power limiter 113 can reduce the voltage charged in the feedback capacitor C2 of the feedback circuit 400 to increase the on/off frequencies of the switches Q1 and Q2 when the level of the sampling signal Vsh output by the sample/hold latch 114 may be increased.

The sample/hold latch 114 may receive the square wave output by the switching frequency generator 111 through a clock signal input terminal.

The sample/hold latch 114 can generate the sampling signal Vsh by sampling the output signal Vc output by the over power detector 115. That is, when the sample/hold latch 114 continuously outputs the sampling signal Vsh that was sampled and held when the square wave may be Low, and when the square wave may be changed to High, it samples and holds the output signal Vc that may be output by the over power detector 115 other than the sampling signal Vsh that was held, and outputs the held sampling signal Vsh.

The over power detector 115 can detecs an input power Pin by using the divided voltage V2 at the node between the resistor R3 and the resistor R4 and the sense voltage Vsense at the resistor Rsense, and outputs a signal Vc corresponding to the input power.

The gate driver 116 can generate a gate control signal Vgs1 for outputting High when an output signal S1 of the NOR gate 119-1 may be High, and outputting Low when the output signal S1 of the NOR gate 119-1 may be Low, and transmits the generated gate control signal Vgs1 to the control electrode of the switch Q1 to thus control the on/off state of the switch Q1.

The gate driver 117 can generate a gate control signal Vgs2 for outputting High when an output signal S2 of the NOR gate 119-2 may be High, and outputting Low when the output signal S2 of the NOR gate 119-2 may be Low, and transmits the gate control signal Vgs2 to the control electrode of the switch Q2 to thus control the on/off state of the switch Q2.

The inverter 118 inverts the square wave output by the switching frequency generator 111 and transmits the inverted square wave to the NOR gate 119-1.

The NOR gate 119-1 receives the output signal of the inverter 118 through one of its two signal input terminals (labeled A), and receives a shut down delay control signal SD through another signal input terminal (labeled B). The NOR gate 119-1 performs a logical operation on the signals input through the input terminal A and the input terminal B to generate an output signal S1, and transmits the output signal S1 to the gate driver 116.

The NOR gate 119-2 receives a square wave output by the switching frequency generator 111 through one (an input terminal A) of the two signal input terminals, and receives a shut down delay control signal SD through another signal input terminal (an input terminal B). The NOR gate 119-2 performs a logical operation on the signals input through the input terminal A and the input terminal B to generate an output signal S2, and transmits the output signal S2 to the gate driver 117.

The shut down control signal generator 112 changes the shut down delay control signal SD to High when the over power may be input for more than a predetermined time. When the shut down delay control signal SD may be changed to High, the NOR gate 119-1 and the NOR gate 119-2 output Low signals, and the two switches Q1 and Q2 are turned off to prevent the circuit damage caused by an input of over power. Here, the shut down control signal generator 112 for outputting a High shut down delay control signal SD when over power may be input for more than a predetermined time will be described later.

Figure 3:
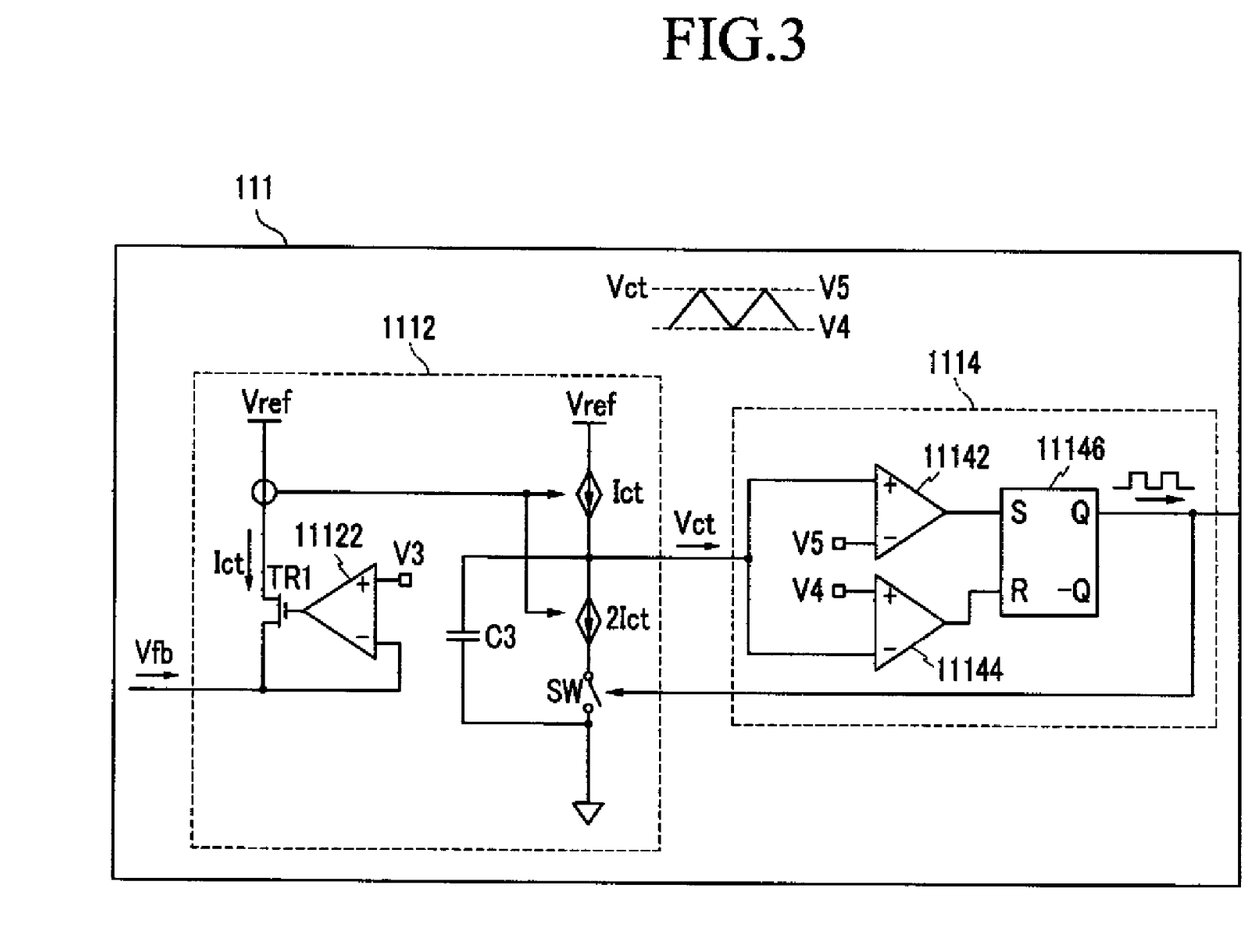
FIG. 3 shows a switching frequency generator 111 in a PFM controller 110 of a synchronous rectifier.

FIG. 3 shows an embodiment of the switching frequency generator 111 in the PFM controller 110 of a synchronous rectifier. T switching frequency generator 111 may include a sawtooth wave generator 1112 and a square wave generator 1114.

The sawtooth wave generator 1112 can include dependent current sources Ict and 2Ict, switches TR1 and SW, a comparator 11122, and a capacitor C3.

The comparator 11122 may receive a V3 voltage and a feedback signal Vfb through a a non inverting input terminal (+) and an inverting input terminal (−), compares the V3 voltage and the feedback signal Vfb, and outputs a comparison result of the V3 voltage and the feedback signal Vfb to an control electrode of the switch TR1.

The switch TR1 has a first terminal coupled to a voltage source Vref for supplying the Vref voltage, and a second terminal coupled to an inverting input terminal (−) of the comparator 11122.

The comparator 11122 turns on the switch TR1 when the feedback signal Vfb may be less than V3, and it turns off the switch TR1 when the feedback signal Vfb reaches V3. Accordingly, the current Ict flowing from the the voltage source Vref through the switch TR1 may be variable by the level of the feedback voltage Vfb. In other words, the current Ict may be increased as the feedback voltage Vfb may be reduced.

The dependent current source Ict has a first terminal coupled to the voltage source Vref for supplying the voltage Vref. The dependent current source 2Ict has a first terminal coupled to a second terminal of the dependent current source Ict. The switch SW has a first terminal coupled to a second terminal of the dependent current source 2Ict and a second terminal coupled to the ground. The capacitor C3 has a first terminal coupled to a node between the dependent current source Ict and the dependent current source 2Ict, and a second terminal coupled to the second terminal of the switch SW. Here, the node between the dependent current source Ict and the dependent current source 2Ict may be coupled to the output terminal of the sawtooth wave generator 1112.

The dependent current source Ict and the dependent current source 2Ict can be formed as a current mirror for the current Ict. Accordingly, the same current Ict as the current Ict flowing from the voltage source Vref through the switch TR1 flows through the dependent current source Ict, and the current 2Ict that may be twice the current Ict flowing from the voltage source Vref through the switch TR1 flows through the dependent current source 2Ict.

The switch SW may be turned on when the output signal of the square wave generator 1114 is High, and it may be turned off when the output signal is Low. While the switch SW is in its off state, the current flows through the path in the order of the dependent current source Ict, the capacitor C3, and the ground, and hence, a predetermined voltage may be charged in the capacitor C3. When the switch SW is in its on state, the voltage charged in the capacitor C3 may be discharged to the ground through the switch SW.

The switch SW may be consecutively turned on/off by the output signal of the square wave generator 1114, and the voltage that is output through the output terminal of the sawtooth wave generator 1112 becomes a sawtooth wave signal Vct having a slope corresponding to the current Ict.

The square wave generator 1114 can include comparators 11142 and 11144 and an SR flip-flop 11146.

The comparator 11142 receives a sawtooth wave signal Vct that is an output signal of the sawtooth wave generator 1112 through the non inverting input terminal (+), and receives a V5 reference voltage through a inverting input terminal (−). The comparator 11142 outputs a High signal when the level of the sawtooth wave signal Vct is greater than the V5 voltage, and outputs a Low signal when the level of the sawtooth wave signal Vct is less than the V5 voltage.

The comparator 11144 receives a V4 reference voltage through a non inverting input terminal (+), and receives the sawtooth wave signal Vct that is the output signal of the sawtooth wave generator 1112 through the inverting input terminal (−). The comparator 11144 outputs a Low signal when the level of the sawtooth wave signal Vct is greater than the V4 voltage, and it outputs a High signal when the level of the sawtooth wave signal Vct is less than the V4 voltage. Here, the V4 voltage is less than the V5 voltage.

The SR flip-flop 11146 receives an output signal of the comparator 11142 through the set terminal S, and receives an output signal of the comparator 11144 through the reset terminal R. The SR flip-flop 11146 can output a square wave signal through the non inverting output terminal Q corresponding to the input signals of the set terminal S and the reset terminal R.

The switch SW of the sawtooth wave generator 1112 may be turned on/off corresponding to the output signal of the SR flip-flop 11146, and since the output signal of the SR flip-flop 11146 is a square wave, the switch SW repeats the turn on/off operation.

An operation of the switching frequency generator 111 will now be described in detail.

The operation of the switching frequency generator 111 is described starting at the time when the switch SW is turned off. Since the switch SW is turned on when the output signal of the non inverting output terminal Q of the SR flip-flop 11146 is High and it is turned off when the output signal is Low, the output signal of the non inverting output terminal Q of the SR flip-flop 11146 is Low.

At this time the capacitor C3 may be charged with the voltage by the current Ict flowing from the dependent current source Ict to the ground through the capacitor C3. When the capacitor C3 is charged with the voltage and the voltage of the output terminal of the sawtooth wave generator 1112 is sensed to be greater than the V5 voltage, the output signal of the comparator 11142 becomes High. In this instance, since the output signal of the comparator 11144 becomes Low, the output signal of the non inverting output terminal Q of the SR flip-flop 11146 is changed to High.

After the output signal of the non inverting output terminal Q of the SR flip-flop 11146 is changed to High, the switch SW may be turned on. Accordingly, the voltage charged in the capacitor C3 may be reduced and the level of the sawtooth wave signal Vct may be reduced. When the level of the sawtooth wave signal Vct becomes less than the V5 voltage, the output signal of the comparator 11142 is changed to Low. At this time, since the output signal of the comparator 11144 remains Low, the output signal of the non inverting output terminal Q of the SR flip-flop 11146 maintains High.

When the voltage charged in the capacitor C3 is continuously discharged to sense that the level of the sawtooth wave signal Vct becomes less than the V4 voltage while the switch SW maintains the turn-on state, the level of the output signal of the comparator 11144 is changed to High. At this time, since the output signal of the comparator 11142 is Low, the output signal of the non inverting output terminal Q of the SR flip-flop 11146 is changed to Low.

Since the output signal of the non-inverting output terminal Q of the SR flip-flop 11146 is changed to Low, the switch SW is turned off and the capacitor C3 is charged with the voltage.

As the above-noted process is repeated, the sawtooth wave signal Vct rises and falls with a predetermined slope substantially between the V4 voltage and the V5 voltage, shown in FIG. 3. Here, the rising and falling slope of the sawtooth wave signal Vct may be inversely proportional to the level of the feedback signal Vfb. In other words, the on/off frequencies of the switches Q1 and Q2 can be inversely proportional to the level of the feedback signal Vfb.

Here, the level of the feedback signal Vfb may be inversely proportional to the load of the output terminal of the output unit 300. Also, since the level of the feedback signal Vfb may be inversely proportional to the level of the sampling signal Vsh that is input to the power limiter 113, the level of the sampling signal Vsh may be proportional to the on/off frequencies of the switches Q1 and Q2.

When over power is input, the level of the sampling signal Vsh is increased, and the on/off frequencies of the switches Q1 and Q2 are increased to thereby prevent the damage of the circuit elements when the over power is input.

The shut down control signal generator 112 will now be described with reference to FIG. 4.

Figure 4:
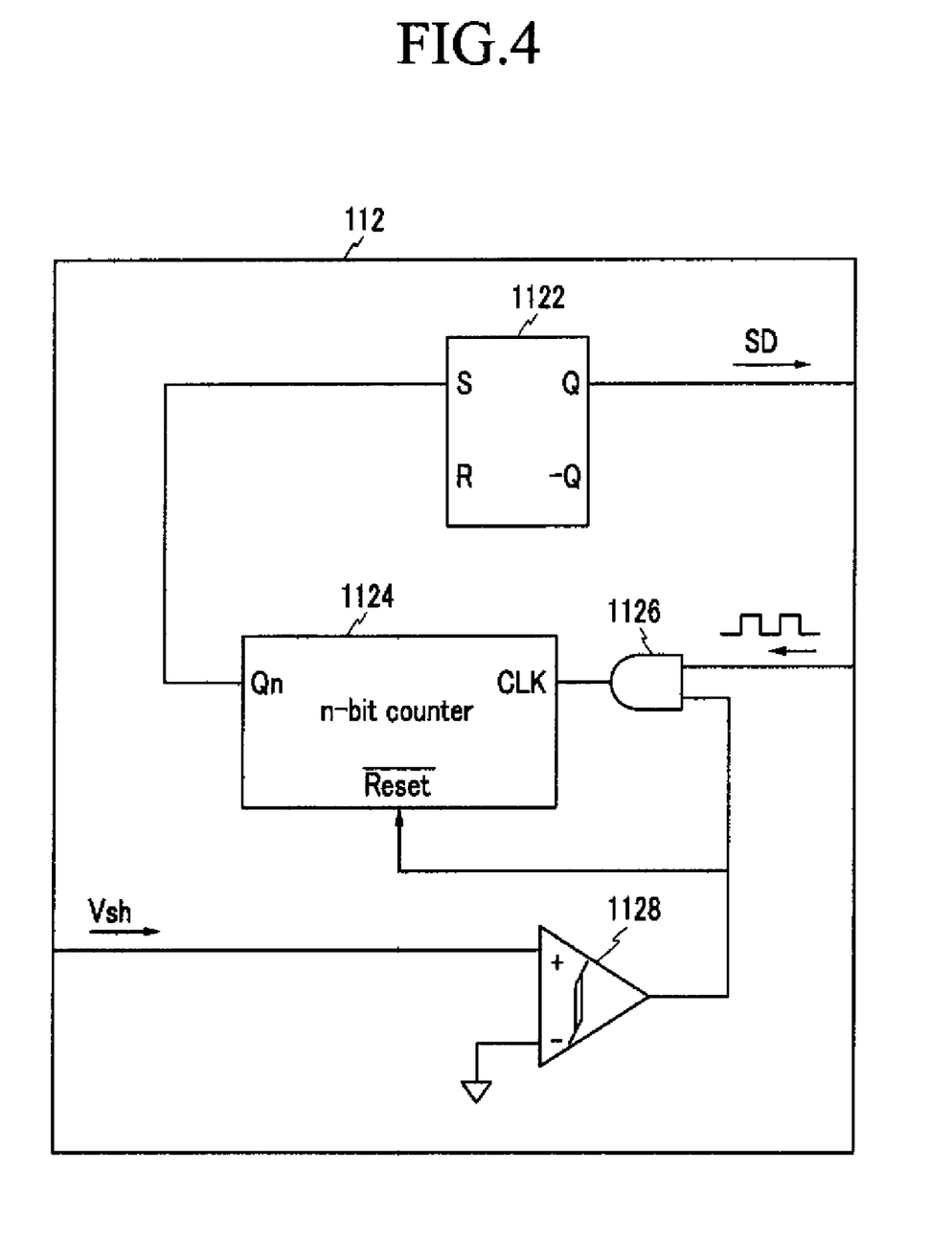
FIG. 4 shows a shut down control signal generator 112 in a PFM controller 110 of a synchronous rectifier.

FIG. 4 shows a shut down control signal generator 112 in a PFM controller 110 of a synchronous rectifier.

The shut down control signal generator 112 can include an SR flip-flop 1122, an N bit counter 1124, an AND gate 1126, and a comparator 1128.

The comparator 1128 compares the sampling signal Vsh that is input to the non inverting input terminal and the ground voltage that is input to the inverting input terminal, generates a High or Low signal according to a comparison result, and transmits the corresponding signal to the N bit counter 1124 and the AND gate 1126.

The comparator 1128 outputs a High signal when the sampling signal Vsh is greater than the ground voltage, and it outputs a Low signal when the sampling signal Vsh is less than the ground voltage. For reference, in FIG. 4, a Schmidt trigger is used for the comparator 1128, and other elements performing the same operation are also applicable.

The AND gate 1126 receives the square wave that is output from the switching frequency generator 111 through one (an input terminal A) of the two signal input terminals, and receives the output signal of the comparator 1128 through another signal input terminal (an input terminal B).

The AND gate 1126 performs a logical operation on the signals that are input through the input terminal A and the input terminal B to generate a High or Low signal, and transmits the corresponding signal to the N bit counter 1124.

The N bit counter 1124 can receive the output signal of the comparator 1128 through an inverting reset signal input terminal/Reset, and receives the output signal of the AND gate 1126 through a clock signal input terminal CLK.

The N bit counter 1124 is reset when the output signal of the comparator 1128 is changed to Low, and it counts the number of times for toggling the signal that is input through the clock signal input terminal CLK from Low to High by the number of the N bits when the output signal of the comparator 1128 is changed from Low to High. When the toggling number reaches N, the N bit counter 1124 changes the output signal that is output through the output terminal Qn to High. Here, the signal that is input to the clock signal input terminal CLK of the N bit counter 1124 is the output signal of the AND gate 1126, and the AND gate 1126 outputs the signal level of the square wave that is output from the switching frequency generator 111 when the output signal of the comparator 1128 is High.

The SR flip-flop 1122 can receive the output signal of the N bit counter 1124 through the set terminal S, and outputs the signal with the same level as the signal that is input to the set terminal S through the non inverting output terminal Q. Here, the output signal of the SR flip-flop 1122 is the shut down delay signal SD.

When the shut down delay signal SD is High, the two switches Q1 and Q2 are turned off. That is, when the sampling signal Vsh is maintained to be greater than the ground voltage for a predetermined time (i.e., the period in which the square wave that is output from the switching frequency generator 111 is toggled N times from Low to High), the shut down control signal generator 112 determines that over power is continuously input, and turns off the switches Q1 and Q2 to stop the resonant converter in order to prevent the circuit from being damaged because of an input of over power.

A power limiter 113 will now be described with reference to FIG. 5.

Figure 5:
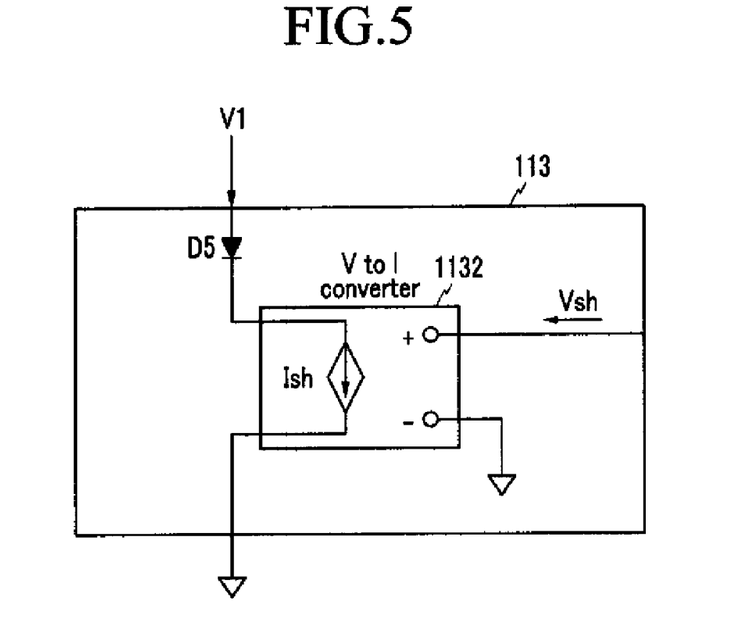
FIG. 5 shows a power limiter 113 in a PFM controller 110 of a synchronous rectifier.

FIG. 5 shows a power limiter 113 in a PFM controller 110 of a synchronous rectifier.

The power limiter 113 can include a diode D5 and a voltage/current converter 1132.

The diode D5 has an anode coupled to a node between the resistor R2 and the feedback capacitor C2 of the feedback circuit 400 through the second terminal 2 of the PFM controller 110.

The voltage/current converter 1132 may include a dependent current source Ish having a first terminal coupled to a cathode of the diode D5 and a second terminal coupled to the ground through a seventh terminal 7 of the PFM controller 110.

The dependent current source Ish flows a variable current corresponding to the level of the sampling signal Vsh to the ground to control the sampling signal Vsh and the voltage charged in the feedback capacitor C2 of the feedback circuit 400 to be inversely proportional with each other. When the voltage charged in the feedback capacitor C2 is reduced, the rising and falling slope of the sawtooth wave signal Vct is increased, and the toggling frequency of the square wave that is output by the switching frequency generator 111 is increased. Since the switches Q1 and Q2 are turned on/off as the square wave is toggled, the power limiter 113 can increase the on/off drive frequencies of the switches Q1 and Q2 when the level of the sampling signal Vsh is increased so as to reduce the power that is induced to the secondary coil L2 of the transformer through the primary coil L1 of the transformer and is then transmitted to the output load side.

The diode D5 prevents the flows of the reverse current flowing from the current source Ish to the feedback circuit 400. When the level of the sampling signal Vsh is reduced to be a minus level, the dependent current source Ish does not flow the variable current to the ground but flows the current from the ground to the node between the resistor R2 and the feedback capacitor C2 of the feedback circuit 400 through the dependent current source Ish. At this time, the variable current is blocked from flowing from the dependent current source Ish to the feedback circuit 400 by the turned-off diode D5. In other words, the power limiter 113 reduces the level of the feedback signal Vfb by the level of the sampling signal Vsh when the level of the sampling signal Vsh is greater than 0V, and it does not change the level of the feedback signal Vfb when the level of the sampling signal Vsh is less than 0V.

The over power detector 115 will now be described with reference to FIG. 6.

Figure 6:
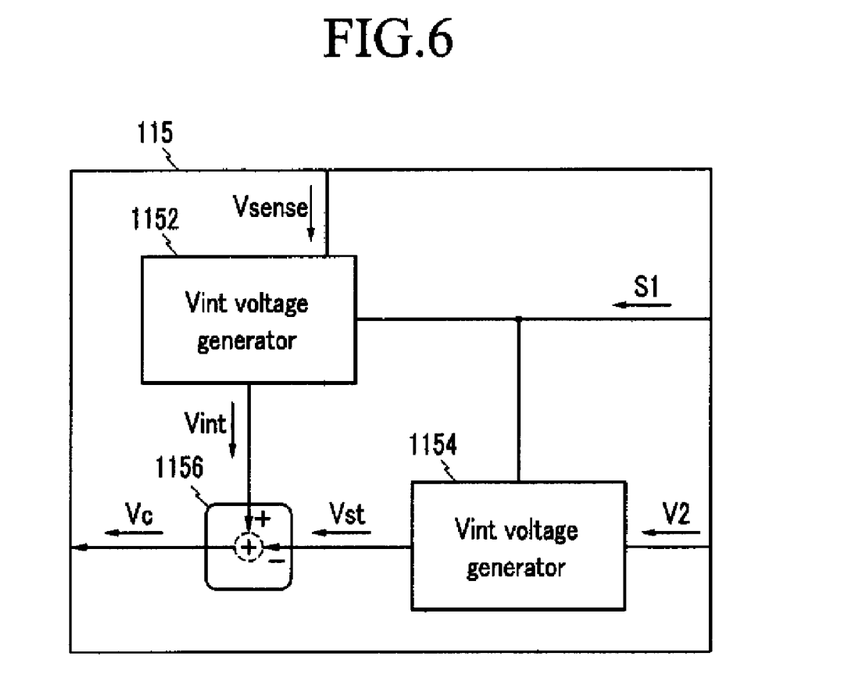
FIG. 6 shows an over power detector 115 in a PFM controller 110 of a synchronous rectifier.

FIG. 6 shows an over power detector 115 in a PFM controller 110 of a synchronous rectifier according to an exemplary embodiment of the present invention.

As shown in FIG. 6, the over power detector 115 can include a Vint voltage generator 1152, a Vst voltage generator 1154, and a comparison operator 1156.

The Vint voltage generator 1152 receives the sense voltage Vsense and the output signal S1 of the NOR gate 119-1. The Vint voltage generator 1152 generates the Vint voltage that is increased corresponding to the sense voltage Vsense at the time when the output signal S1 of the NOR gate 119-1 is changed from High to Low and that is steeply reduced to the ground voltage at the time when the output signal S1 of the NOR gate 119-1 is changed from Low to High. In other words, the Vint voltage corresponds to the integrated value of the current Ids flowing to the switch Q2 from the time when the switch Q2 is turned on to the time when it is turned off.

The Vst voltage generator 1154 may receive the divided voltage V2 applied to the node between the resistor R3 and the resistor R4 corresponding to the input voltage Vin and the output signal S1 of the NOR gate 119-1. The Vst voltage generator 1154 generates a Vst voltage that is increased corresponding to the input voltage Vin at the time when the output signal S1 of the NOR gate 119-1 is changed from High to Low and that is steeply reduced to the ground voltage at the time when the output signal S1 of the NOR gate 119-1 is changed from Low to High. In other words, the Vst voltage generated by the Vst voltage generator 1154 has a sawtooth wave signal form that is increased with a slope and is steeply reduced to 0V. Here, the rising slope of the Vst voltage is inversely proportional to the level of the input voltage Vin.

The comparison operator 1156 compares the Vint voltage that is output from the Vint voltage generator 1152 and the Vst voltage that is output from the Vst voltage generator 1154, and outputs a resultant output signal Vc to the sample/hold latch 114. In detail, the comparison operator 1156 subtracts the Vst voltage from the Vint voltage, and outputs a resultant output signal Vc. That is, when the Vint voltage is greater than the Vst voltage, the output signal Vc of the over power detector 115 becomes positive (+), and when the Vint voltage is less than the Vst voltage, the output signal Vc of the the over power detector 115 becomes negative (−).

The Vint voltage generator 1152 will now be described in detail with reference to FIG. 7.

Figure 7:
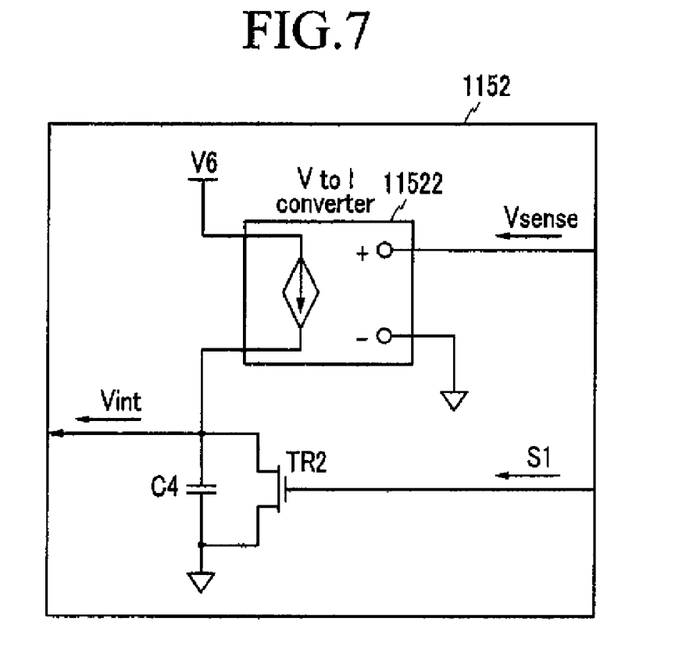
FIG. 7 shows a Vint voltage generator 1152 in an over power detector 115 of a synchronous rectifier.

FIG. 7 shows a Vint voltage generator 1152 in an over power detector 115 of a synchronous rectifier.

The Vint voltage generator 1152 may include a reset switch TR2, a capacitor C4, and a voltage/current converter 11522.

The voltage/current converter 11522 receives the sense voltage Vsense that is applied to the resistor Rsense when the switch Q2 is turned on, and outputs a variable current corresponding to the voltage Vsense.

The capacitor C4 is coupled between the output terminal of the voltage/current converter 11522 and the ground, and the reset switch TR2 is coupled in parallel to the capacitor C4.

The reset switch TR2 is turned on/off corresponding to the output signal S1 of the NOR gate 119-1.

Since the sense voltage Vsense is essentially 0V when the switch Q2 is turned off, the variable current output by the voltage/current converter 11522 is 0 A, and when the switch Q2 is turned on, the sense voltage Vsense is increased, and when the sense voltage Vsense is increased, the variable current output by the voltage/current converter 11522 is increased.

When the output signal S1 of the NOR gate 119-1 is Low, that is, when the switch Q1 is turned off, the variable current output by the voltage/current converter 11522 is increased corresponding to the voltage Vsense. At this time, since the reset switch TR2 maintains the turn-off state, the current output by the voltage/current converter 11522 is charged in the capacitor C4 to increase the Vint voltage.

When the output signal S1 of the NOR gate 119-1 is changed from Low to High, that is, when the switch Q1 is turned on, the reset switch TR2 is turned on and the Vint voltage is steeply reduced to 0 A.

The Vst voltage generator 1154 will now be described with reference to FIG. 8.

Figure 8:
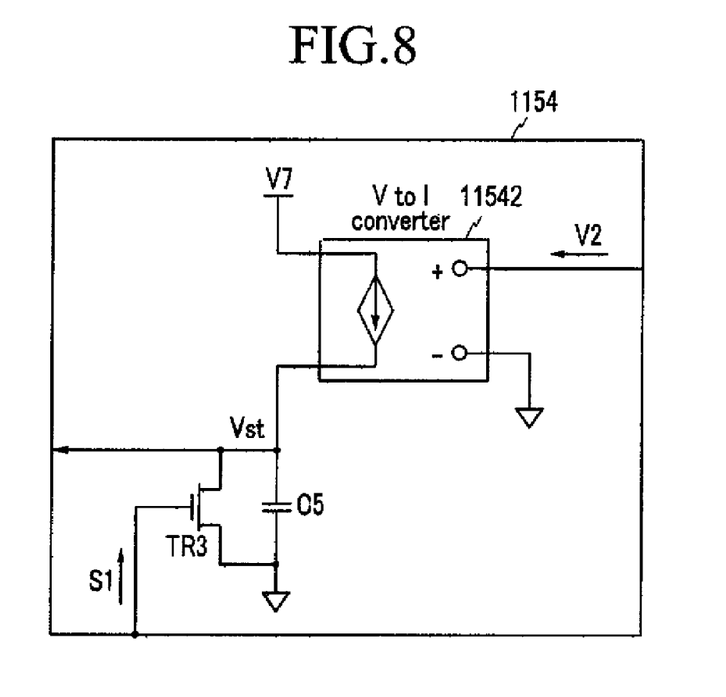
FIG. 8 shows a Vst voltage generator 1154 in an over power detector 115 of a synchronous rectifier.

FIG. 8 shows a Vst voltage generator 1154 in an over power detector 115 of a synchronous rectifier.

The Vst voltage generator 1154 can include a reset switch TR3, a capacitor C5, and a voltage/current converter 11542.

When the switch Q1 is turned on, the divided voltage V2 is maintained at 0V, and when the switch Q2 is turned on, the divided voltage V2 is increased.

The voltage/current converter 11542 receives the increasing divided voltage V2 when the switch Q2 is turned on, and outputs a variable current corresponding to the divided voltage V2.

The capacitor C5 is coupled between the output terminal of the voltage/current converter 11542 and the ground, and the reset switch TR3 is coupled in parallel to the capacitor C5.

The reset switch TR3 is turned on/off corresponding to the output signal S1 of the NOR gate 119-1.

Since the divided voltage V2 is 0V when the switch Q2 is turned off, the variable current output by the voltage/current converter 11542 is 0 A, and when the switch Q2 is turned on, the divided voltage V2 is increased, and when the divided voltage V2 is increased, the variable current output by the voltage/current converter 11542 is increased.

When the output signal S1 of the NOR gate 119-1 is Low, that is, when the switch Q1 is turned off, the variable current output by the voltage/current converter 11542 is increased corresponding to the divided voltage V2. In this instance, since the reset switch TR3 maintains the turn-off state, the variable current output by the voltage/current converter 11542 is charged in the capacitor C5 to increase the Vst voltage.

When the output signal S1 of the NOR gate 119-1 is changed from Low to High, that is, when the switch Q1 is turned on, the reset switch TR3 is turned on and the Vst voltage is steeply reduced to 0 A.

A sawtooth wave signal Vct output by the sawtooth wave generator 1112, a control signal Vgs1 corresponding to the sawtooth wave signal Vct, a voltage Vsense, a Vst voltage, a Vint voltage and a sampling signal Vsh will now be described with reference to FIG. 9.

Figure 9:
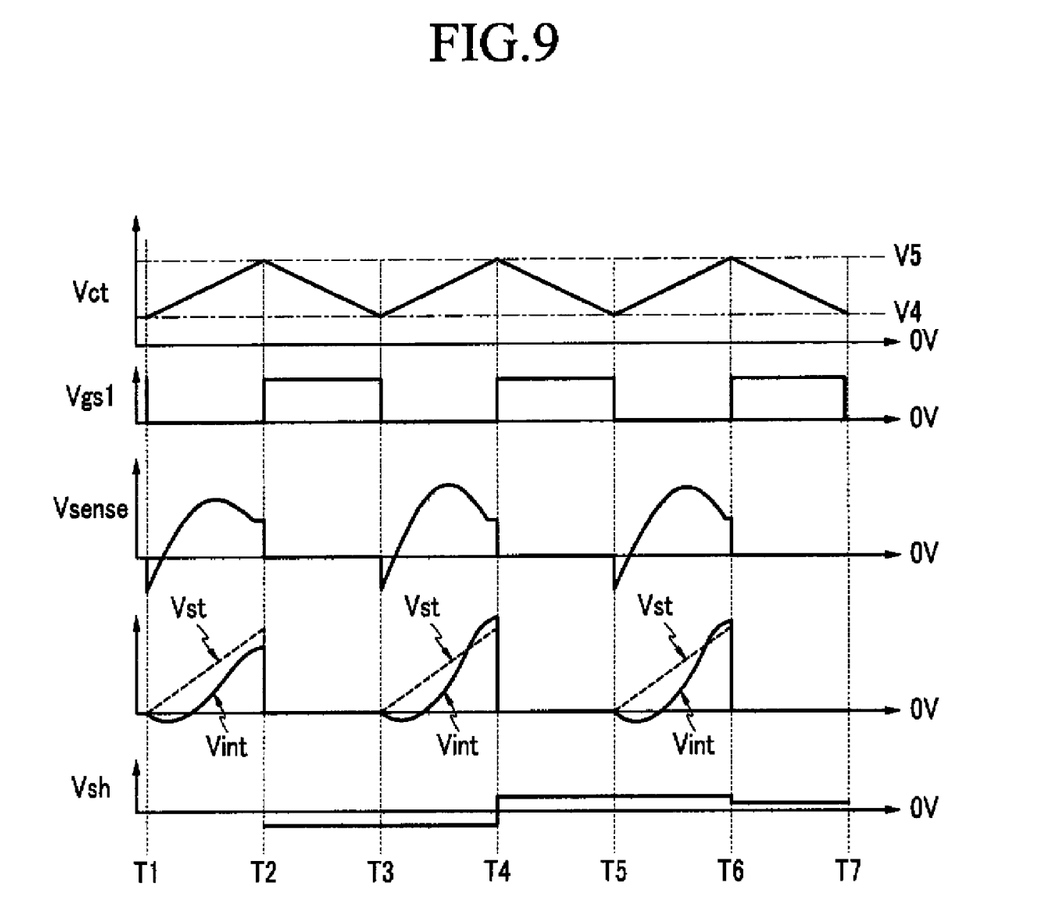
FIG. 9 shows a control signal Vgs1, a voltage Vsense, a Vst voltage, a Vint voltage, and a sampling signal Vsh corresponding to a sawtooth wave signal Vct of a synchronous rectifier.

FIG. 9 shows a control signal Vgs1, a voltage Vsense, a Vst voltage, a Vint voltage, and a sampling signal Vsh corresponding to a sawtooth wave signal Vct of a synchronous rectifier according to an exemplary embodiment of the present invention. For reference, it is shown in FIG. 9 that the switch Q2 is instantly turned on when the switch Q1 is turned off, but it is natural to provide a dead time between the control signal Vgs1 and the control signal Vgs2 so as to prevent penetration current caused by the arm short phenomenon and to perform zero voltage switching.

Before the time T1, the sawtooth wave signal Vct output through the output terminal of the sawtooth wave generator 1112 falls from the V5 voltage to the V4 voltage, and the output signals of the comparator 11142 and the comparator 11144 become Low.

At the time T1, the sawtooth wave signal Vct output through the output terminal of the sawtooth wave generator 1112 falls to be less than the V4 voltage.

When the sawtooth wave signal Vct falls to be less than the V4 voltage, the output signal of the comparator 11142 maintains Low, and the output signal of the comparator 11144 is changed to High, and the output signal of the non inverting output terminal (Q) of the SR flip-flop 11146 is changed to Low. Accordingly, the switch Q1 is turned off since the control signal Vgs1 and the output signal S1 of the NOR gate 119-1 are changed to Low.

When the output signal of the SR flip-flop 11146 is changed to Low, the switch SW is turned off, and the sawtooth wave signal Vct is increased. When the sawtooth wave signal Vct is increased to be greater than the V4 voltage, the output signal of the comparator 11142 maintains Low, and the output signal of the comparator 11144 is changed to Low, and the output signal of the non inverting output terminal (Q) of the SR flip-flop 11146 maintains Low. Accordingly, the control signal Vgs1 and the output signal S1 of the NOR gate 119-1 maintain Low, and the switch Q1 is turned off.

When the switch Q1 is turned off, the switch Q2 is turned on through zero voltage switching, and the sense voltage Vsense instantly falls and rises. In this instance, since the output signal S1 of the NOR gate 119-1 is Low, the Vint voltage corresponding to the sense voltage Vsense also falls to the negative (−) and then rises, and the Vst voltage gradually rises.

The time T2 represents the time when the sawtooth wave signal Vct is increased to be greater than the V5 voltage.

Since the output signal of the SR flip-flop 11146 remains Low, the switch SW is turned off, and the sawtooth wave signal Vct is continuously increased to be greater than the V5 voltage. When the sawtooth wave signal Vct becomes greater than the V5 voltage, the output signal of the comparator 11144 maintains Low, and the output signal of the comparator 11142 is changed to High. Accordingly, the output signal of the non inverting output terminal (Q) of the SR flip-flop 11146 is changed to High. Also, the control signal Vgs1 and the output signal S1 of the NOR gate 119-1 are changed to High, and the switch Q1 is turned on.

When the output signal of the non inverting output terminal (Q) of the SR flip-flop 11146 is changed to High, the switch SW is turned on, and the sawtooth wave signal Vct. When the sawtooth wave signal Vct is reduced to be less than the V5, the output signal of the comparator 11144 maintains Low, and the output signal of the comparator 11142 is changed to Low. In this instance, the output signal of the non inverting output terminal (Q) of the SR flip-flop 11146 maintains High. Accordingly, the control signal Vgs1 and the output signal S1 of NOR gate 119-1 maintain High, and the switch Q1 is turned on.

When the output signal of the non inverting output terminal (Q) of the SR flip-flop 11146 is toggled from Low to High, the sample/hold latch 114 samples and holds the output signal Vc of the over power detector 115, and outputs the held sampling signal Vsh. At the time T2, since the Vst voltage is greater than the Vint voltage, the output signal Vc of the over power detector 115 becomes negative.

The sample/hold latch 114 can generate a sampling signal Vsh by sampling the output signal Vc of the over power detector 115 each time the output signal of the non inverting output terminal (Q) of the SR flip-flop 11146 is toggled from Low to High. Resultantly, the level of the sampling signal Vsh that is output by the sample/hold latch 114 until the time T2 is a value that is generated by sampling the output signal Vc of the over power detector 115 when the output signal of the non inverting output terminal (Q) of the SR flip-flop 11146 is changed from Low to High before the time T2. The Vst voltage and the Vint voltage when the sample/hold latch 114 performs a sampling operation before the time 12 is not shown in FIG. 9, and hence, the level of the output signal Vc of the over power detector 115 cannot be detected, and thus the sampling signal Vsh output by the sample/hold latch 114 is not shown until time T2 in FIG. 9. Here, although the sampling signal Vsh output by the sample/hold latch 114 is not shown until the time T2 in FIG. 9, the sample/hold latch 114 consecutively outputs the sampling signal Vsh that is sampled and held before the time T2.

Since the output signal S1 of the NOR gate 119-1 is High when the control signal Vgs is high, the switches TR2 and TR3 are turned on and the voltages charged in the capacitors C4 and C5 are discharged, and hence, the Vint voltage and the Vst voltage instantly fall to 0V.

The switch Q2 is turned off before the switch Q1 is turned on, and when the switch Q1 is accordingly turned on, the sense voltage Vsense instantly falls to 0V.

The time T3 represents the time when the sawtooth wave signal Vct is reduced to be less than the V4 voltage.

Since the output signal of the SR flip-flop 11146 maintains High, the switch SW maintains the turn-on state, and the sawtooth wave signal Vct is continuously reduced to be less than the V4 voltage. When the sawtooth wave signal Vct is reduced to be less than the V4 voltage, the output signal of the comparator 11142 maintains Low, and the output signal of the comparator 11144 is changed to High. In this instance, the output signal of the non inverting output terminal (Q) of the SR flip-flop 11146 is changed to Low. Hence, the control signal Vgs1 and the output signal S1 of the NOR gate 119-1 are changed to Low, and the switch Q1 is turned off.

Part after the time T3 repeats the above-described part after the time T1 very similarly, and hence, the same contents will be omitted and the different part will be described.

At the time T4, the output signal of the non inverting output terminal (Q) of the SR flip-flop 11146 is toggled from Low to High, and the sample/hold latch 114 samples the output signal Ve of the over power detector 115. In this instance, since the Vint voltage is greater than the Vst voltage, the output signal Vc of the over power detector 115 becomes positive, and the sampling signal Vsh that is sampled and output by the sample/hold latch 114 becomes positive.

Since the sampling signal Vsh is changed to be a positive value, the output signal of the comparator 1124 of the shut down control signal generator 112 is changed from Low to High.

The N bit counter 1124 counts the number of times for toggling the signal that is input through the clock signal input terminal CLK from Low to High from the time when the output signal of the comparator 1124 becomes High.

When the level of the sampling signal Vsh becomes to be increased, the power limiter 113 increases the current flowing from the node between the resistor R2 and the feedback capacitor C2 of the feedback circuit 400 to the ground, and reduces the level of the feedback signal Vfb. Since the reduction of the feedback signal Vfb increases the current Ict flowing to the switch TR1, the slope of the sawtooth wave signal Vct rising and falling between the V4 voltage and the V5 voltage is increased. As a result, a toggling frequency of the square wave output by the switching frequency generator 111 is increased. That is, when the Vint voltage is greater than the Vst voltage, the damage of the circuit elements caused by the input of over power is prevented by increasing the on/off frequencies of the switches Q1 and Q2.

At the time T6, since the Vint voltage is greater than the Vst voltage, the output signal Vc of the over power detector 115 becomes a positive value, and since the voltage difference between the Vint voltage and the Vst voltage is less than the point of the time T4, the output signal Vc of the over power detector 115 becomes a positive value which is less than the point of the time T4. Also, the sampling signal Vsh that is sampled and output by the sample/hold latch 114 is a positive value which is less than the point at the time T4.

Accordingly, the N bit counter 1124 having started to count the number of times of toggling the signal that is input through the clock signal input terminal CLK when the sampling signal Vsh becomes a positive value at the time T4, continuously counts the number of times of toggling the signal that is input through the clock signal input terminal CLK. When the number of toggling times reaches N, the N bit counter 1124 changes the output signal that is output by the output terminal (Qn) to High to turn off the two switches Q1 and Q2 and prevent the circuit from being damaged by the consecutive input of over power.

When the level of the sampling signal Vsh is reduced by a predetermined degree, the power limiter 113 reduces the amount of current flowing from the node between the resistor R2 and the feedback capacitor C2 of the feedback circuit 400 to the ground by a predetermined degree, and increases the level of the feedback signal Vfb. Since the increase of the feedback signal Vfb reduces the amount of current Ict flowing to the switch TR1, the slope of the sawtooth wave signal Vct rising and falling between the V4 voltage and the V5 voltage is reduced. As a result, the toggling frequency of the square wave that is output by the switching frequency generator 111 is reduced.

The resonant converter can determine whether the Vint voltage corresponding to the input power Pin exceeds the Vst voltage each time the switch Q1 is turned on, and controls the on/off drive frequencies of the switches Q1 and Q2 according to the determination result. Accordingly, differing from the general resonant converter, the circuit is prevented from being damaged when high power is instantly supplied in a like manner of the electromagnetic interference (EMI).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resonant converter comprising:
    a square wave generator including a first primary-side switch and a second primary-side switch that are coupled to a primary coil of a transformer, and generating a first square wave corresponding to an input voltage by alternately turning on/off the first primary-side switch and the second primary-side switch;
    a resonator including a first coil of the primary coil of the transformer, and generating a resonance waveform corresponding to the first square wave; and
    an output unit including a second coil of a secondary coil of the transformer, and outputting an output voltage corresponding to a current that is generated in the second coil corresponding to the resonance waveform, and wherein
    the square wave generator includes a pulse frequency modulation controller for (i) turning on/off the first primary-side switch and the second primary-side switch, (ii) comparing, at the time when the second primary-side switch is turned off, a rising voltage that is linearly increased while the second primary-side switch maintains the turn-on state and an integrated voltage corresponding to an integrated value, integrated over a time of the current flowing to the second primary-side switch, and (iii) changing on/off drive frequencies of the first primary-side switch and the second primary-side switch according to a result of the comparison.

2. The resonant converter of claim 1, wherein
    when the integrated voltage is greater than the rising voltage, the on/off drive frequencies of the first primary-side switch and the second primary-side switch are increased.

3. The resonant converter of claim 1, wherein the resonator includes:
    a resonant inductor having a first terminal coupled to an input terminal and a second terminal coupled to a first terminal of the first coil; and
    a resonant capacitor having a first terminal coupled to a second terminal of the first coil, and wherein:
    the first primary-side switch has a first terminal coupled to the input terminal and a second terminal coupled to a second terminal of the resonant capacitor; and
    the second primary-side switch has a first terminal coupled to the second terminal of the first primary-side switch;
    and wherein the square wave generator further includes:
    a first resistor coupled between the second primary-side switch and a ground; and
    a second resistor and a third resistor coupled in series between the first terminal of the first primary-side switch and the ground.

4. The resonant converter of claim 3, wherein
    the rising voltage corresponds to a divided voltage applied to a node between the second resistor and the third resistor, and the integrated voltage corresponds to a sense voltage applied to the first resistor.

5. The resonant converter of claim 4, wherein the pulse frequency modulation controller includes:
    a switching frequency generator for generating a second square wave toggled between a first level and a second level that is greater than the first level;
    an input power detector for generating the rising voltage and the integrated voltage by converting the divided voltage and the sense voltage, respectively, and outputting a comparison voltage by comparing the rising voltage and the integrated voltage;
    a sample/hold latch for sampling the comparison voltage when the second square wave is toggled from the first level to the second level, and outputting the generated sampling signal;
    a power controller for changing a frequency of the second square wave corresponding to a level of the sampling signal;
    a first gate driver for turning on the second primary-side switch when the second square wave is at the first level; and
    a second gate driver for turning on the first primary-side switch when the second square wave is at the second level.

6. The resonant converter of claim 5, wherein the pulse frequency modulation controller further includes a shutdown control signal generator for turning off the first primary-side switch and the second primary-side switch when the sampling signal of the comparison voltage remains positive longer than a setting period.

7. The resonant converter of claim 5, wherein the input power detector includes:
    a first voltage generator for generating the rising voltage that rises with a slope that is inversely proportional to a level of the input voltage by converting the divided voltage while the second square wave maintains the first level;
    a second voltage generator for generating the integrated voltage corresponding to a value that is generated by integrating the current flowing to the first resistor by converting the sense voltage while the second square wave maintains the first level; and
    a comparator for generating the comparison voltage by subtracting the rising voltage from the integrated voltage.

8. The resonant converter of claim 7, wherein each of the rising voltage and the integrated voltage falls to the ground voltage when the second square wave is changed from the first level to the second level.

9. The resonant converter of claim 7, wherein the first voltage generator includes:
    a first voltage-current converter for generating a first variable current corresponding to the divided voltage;
    a first capacitor coupled between an output terminal of the first voltage-current converter and a ground; and
    a first reset switch coupled in parallel to the first capacitor and turned on/off corresponding to the second square wave.

10. The resonant converter of claim 9, wherein
    the first variable current is proportional to the divided voltage, and the rising voltage is charged in the first capacitor.

11. The resonant converter of claim 7, wherein the second voltage generator includes:
    a second voltage-current converter for generating a second variable current corresponding to the sense voltage;
    a second capacitor coupled between an output terminal of the second voltage-current converter and the ground; and
    a second reset switch coupled in parallel to the second capacitor and turned on/off corresponding to the second square wave.

12. The resonant converter of claim 11, wherein the second variable current is proportional to the sense voltage, and the integrated voltage is charged in the second capacitor.

13. The resonant converter of claim 5, wherein the resonant converter further includes a feedback circuit for transmitting to the switching frequency generator a feedback voltage corresponding to the output voltage, the feedback circuit including a feedback capacitor charged with a voltage corresponding to the feedback voltage, and the power controller includes a third voltage-current converter for flowing a third variable current corresponding to the sampling signal from the feedback capacitor to the ground.

14. The resonant converter of claim 13, wherein
the power controller further includes a diode having an anode coupled to the feedback capacitor, and
the third voltage-current converter includes a dependent current source coupled between a cathode of the diode and the ground, and the dependent current source outputs the third variable current that is proportional to the sampling signal.

15. The resonant converter of claim 13, wherein
the frequency for toggling the second square wave between the first level and the second level corresponds to the feedback voltage.

16. The resonant converter of claim 15, wherein
the frequency for toggling the second square wave between the first level and the second level is inversely proportional to the feedback voltage.

* * * * *